United States Patent Office 3,141,886
Patented July 21, 1964

3,141,886
2,3-DIMERCAPTOQUINOXALINE DERIVATIVES
Klaus Sasse, Cologne-Stammheim, Richard Wegler, Leverkusen, and Günter Unterstenhöfer, Opladen, Germany, assignors to Farbenfabriken Bayer Aktiengesellschaft, Leverkusen, Germany, a corporation of Germany
No Drawing. Original application June 30, 1959, Ser. No. 823,825, now Patent No. 3,091,613, dated May 28, 1963. Divided and this application Dec. 12, 1962, Ser. No. 244,026
11 Claims. (Cl. 260—250)

The present invention relates to and has as its objects new and useful pesticidal compounds and processes for the production thereof. Generally the new compounds of this invention are derivatives of 2,3-dimercaptoquinoxalines which may be represented by the following general formula:

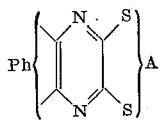

in which A stands for one or two acyl radicals or one CO—, CS—, CNR'— (R' being alkyl or aryl), S- or SO-group, and Ph stands for an annelled benzene or naphthalene nucleus.

This application is a divisional application of copending application Serial No. 823,825, filed June 30, 1959, now U.S. Patent 3,091,613.

According to D. C. Morrison and A. Furst (Journal of Organic Chemistry, vol. 21, page 470 (1956)), 2,3-dimercaptoquinoxaline may be obtained by reacting 2,3-dichloroquinoxaline with thiourea and subsequent alkaline splitting of the bis-thiouronium salt thus formed, or also by the action of phosphorus pentasulphide on 2,3-dihydroxyquinoxaline. It is further known that this compound may be alkylated with ethyl bromide in an alkaline-alcoholic medium. Neither the free 2,3-dimercaptoquinoxaline nor its salts and alkylation products possess marked biocidal properties.

It has now been found that compounds having a very good acaricidal and ovicidal effect are obtainable by acylation of 2,3-dimercaptoquinoxaline or its substitution products. The term "acylation" is to be understood in the widest possible sense comprising inorganic as well as organic acyl derivatives. By reaction with monofunctional acid halides or anhydrides products are obtained having one or two acyl radicals. Suitable acid halides are for example carboxylic acid halides, thiocarboxylic acid halides, sulphenic acid halides, sulphinic acid halides, sulphonic acid halides, chloroformic acid esters, thiocarboxylic acid ester halides, carbamic acid halides, chlorosulphonic acid esters or chlorosulphonic acid amides. In addition to acid halides or anhydrides, isocyanates or isothiocyanates are likewise suitable for the production of acylation products of 2,3-dimercaptoquinoxalines, according to the invention.

By the reaction with bifunctional acid halides containing both halogen atoms at the same atom such as phosgene, thiophosgene, thionyl chloride or sulphuryl chloride, cyclic derivatives of 2,3-dimercaptoquinoxaline can be obtained in a surprisingly smooth reaction.

The production of the compounds according to the invention is carried out by generally known methods. Thus, acid halides which are not very sensitive to moisture such as aromatic carboxylic acid halides, chloroformic acid esters, sulphonic acid halides, may be reacted with 2,3-dimercaptoquinoxaline or its nuclear substitution products in an aqueous medium or also in mixtures of water-miscible or -immiscible solvents in the presence of acid-binding agents such as alkali metal or alkaline earth metal hydroxides or carbonates, tertiary amines and the like. Acid halides which are easily hydrolysed by water are expediently reacted with the salts, for example the alkali metal salts, of 2,3-dimercaptoquinoxaline or with the free dimercaptoquinoxaline in the presence of acid-binding agents in inert organic solvents such as hydrocarbons, dioxane, acetone and the like. The reaction mixtures are worked up in usual manner by filtration, distilling off of the solvent and the like.

The production of 2,3-dimercaptoquinoxaline and its nuclear substitution products is expediently carried out in an especially simple manner by treating 2,3-dichloroquinoxaline or its derivatives with aqueous solutions of potassium or sodium sulphohydrate at an elevated temperature, in general below 100° C. This practical process, which gives quantitative yields, is likewise not yet known from literature.

The new compounds obtainable according to this process have an outstanding activity on various insects, especially spider mites, chiefly on living plants. Their broad spectrum of activity is illustrated for example by their suitability for combating *Tetranychus telarius*, *Tetranychus althaeae* as well as *Paratetranychus pilosus*. The chiefly very slight solubility of the compounds and their high stability ensure a persistent effect. The majority have also a good ovicidal action so that treated plants can be kept free of infestation for prolonged periods.

The acaricidal action of some of the compounds according to the invention can be seen from the following results which were obtained on *Tetranychus telarius* with aqueous concentrations of 0.2% active ingredient or lower after 48 hours.

Under infection number after 8 days an Index is given which means

0—no infection
1—very slight infection
2—medium slight infection
3—medium infection
4—heavy infection
5—very heavy infection

| Compound | Concentration, percent | Mortality after 4 hours (percent) | Infection No. after 8 days |
|---|---|---|---|
| Control | | 0 | 5 |
| [structure: N,S—COOCH₃ / N,S—COOCH₃] | 0.2 | 70 | 0–1 |
| H₃C— [structure: N,S—COOCH₃ / N,S—COOCH₃] | 0.2 | 100 | 0–1 |
| CH₃ H₃C— [structure: N,S—COOCH₃ / N,S—COOCH₃] | 0.2 | 100 | 0 |
| | 0.05 | 100 | 0 |
| | 0.02 | 95 | 1 |
| [structure: N,S—COOC₂H₅ / N,S—COOC₂H₅] | 0.2 | 40 | 1 |

| Compound | Concentration, percent | Mortality after 48 hours (percent) | Infection No. after 8 days |
|---|---|---|---|
| (2,3-bis(ethoxycarbonylthio)-8-methylquinoxaline) | 0.2<br>0.02 | 100<br>60 | 0<br>— |
| (2,3-bis(ethoxycarbonylthio)-6-methylquinoxaline) | 0.2 | 95 | 0 |
| (quinoxaline-2,3-dithiol cyclic S,S-sulfoxide) | 0.2 | 95 | — |
| Control | — | — | — |
| (quinoxaline-2,3-dithiol cyclic thiocarbonate) | 0.2<br>0.025<br>0.0125 | 100<br>99<br>60 | 0<br>0–1<br>1 |
| (6-methyl derivative, C=S) | 0.2 | 80 | — |
| (6-chloro derivative, C=S) | 0.2 | 80 | — |
| (6-methoxy derivative, C=S) | 0.2 | 100 | — |
| (quinoxaline-2,3-dithiol cyclic carbonate) | 0.2<br>0.025<br>0.005<br>0.001 | 100<br>100<br>100<br>100 | 0<br>0<br>0<br>0(–1) |
| (8-methyl derivative, C=O) | 0.2<br>0.05<br>0.01<br>0.005 | 100<br>100<br>100<br>100 | 0<br>0<br>0<br>1 |
| (6,8-dimethyl-2,3-bis(ethoxycarbonylthio)quinoxaline) | 0.2<br>0.05<br>0.02 | 100<br>100<br>80 | 0<br>0–1<br>1 |
| (2,3-bis(allyloxycarbonylthio)quinoxaline) | 0.2 | 100 | 0–1 |

| Compound | Concentration, percent | Mortality after 48 hours (percent) | Infection No. after 8 days |
|---|---|---|---|
| Control | — | 0 | 5 |
| (2,3-bis(phenoxycarbonylthio)quinoxaline) | 0.2 | 100 | 0–1 |
| (6,8-dimethyl-2,3-bis(phenoxycarbonylthio)quinoxaline) | 0.2<br>0.05 | 100<br>100 | 0<br>1 |
| (2,3-bis(ethoxythiocarbonylthio)quinoxaline) | 0.2 | 98 | 0 |
| (2,3-bis(phenylcarbamoylthio)quinoxaline) | 0.2 | 60 | — |
| (2,3-bis(trichloromethylthio)quinoxaline) | 0.2 | 95 | — |
| (6-methyl-quinoxaline-2,3-dithiol cyclic carbonate) | 0.2<br>0.02<br>0.002<br>0.0004 | 100<br>100<br>100<br>50 | 0<br>0<br>1<br>1 |
| Control | — | 0 | 5 |
| (6,8-dimethyl derivative, C=O) | 0.2<br>0.05 | 100<br>100 | 0<br>0 |
| (6-methoxy derivative, C=O) | 0.2<br>0.02 | 100<br>100 | 0<br>0 |
| (bis(3-hydroxyquinoxalin-2-yl) thiocarbonate structure) | 0.2 | 100 | 0 |

The ovicidal activity of the compounds against eggs of insects is to be seen from the following results:

active ingredient:

(6-methyl-quinoxaline-2,3-dithiol cyclic carbonate)

| Concentration (percent) | Ephestia kuehniella Zell. | Bruchidius optectus | Galeria melonella |
|---|---|---|---|
| | Percent of living pests after— | | |
| | 4 days | 5–6 days | 10–12 days |
| Control | 100 | 100 | 100 |
| 0.1 | 0 | 0 | 0 |
| 0.03 | 0 | 0 | |
| 0.01 | | 5 | |
| 0.003 | | 10 | |

The tests have been carried out with 1 to 2 days old eggs on pesticides in which drip wet filter paper (with the above-said concentration) has been placed.

The aqueous solutions were prepared from mixtures of the active substance with equal parts of dimethylformamide and an emulsifier (commercially available aryl polyglycol ether) and subsequent dilution with water to the above-said concentration.

In addition to the liquid form, powdered mixtures with chalk, talc, bentonite and the like may also be employed for practical purposes. Also the application in the so-called "slurry" form is sometimes advantageous, in this case emulsifiers have to be added to the powdered formulation.

The following examples are given for the purpose of illustrating the invention without limiting it thereto.

*Example 1*

30 parts of the disodium salt of 2,3-dimercaptoquinoxaline are suspended in 250 parts of benzene and treated dropwise with stirring at room temperature with 27.2 parts of chloroformic acid ethyl ester. The mixture is heated and boiled with stirring for 5 hours. The insoluble matter is filtered off hot, the filtrate evaporated down to dryness. 26 parts, i.e. 60% of the theoretical, of a compound having the formula

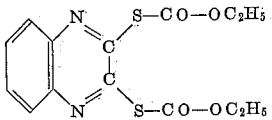

remain behind in the form of yellow crystals which, after recrystallisation from ethanol, melt at 96–98° C.

*Example 2*

97 parts of 2,3-dimercaptoquinoxaline are dissolved in a solution of 40 parts of sodium hydroxide in 300 parts of water. After the addition of 250 parts of acetone, 52.5 parts of thiophosgene are added dropwise with slight cooling at a temperature of 5 to 10° C. The mixture is stirred at ambient temperature for a further half an hour, the precipitated product filtered off with suction, washed with water and alcohol and dried. Yield: 95 parts (i.e. 80% of the theoretical) of a compound having the formula

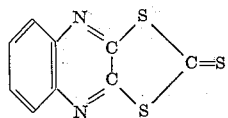

which, after recrystallisation from dioxane, shows melting point 170° C.

*Example 3*

In a similar manner to Example 2 there is obtained from 25 parts of 6-chloro-2,3-dimercaptoquinoxaline and 14 parts of thiophosgene a product of the formula

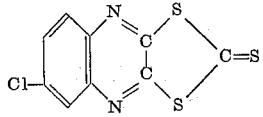

in about 70% yield. Melting point 171–172° C. (after recrystallisation from glycolmonomethyl ether).

*Example 4*

Into a solution of 19.4 parts of 2,3-dimercaptoquinoxaline and 12 parts of sodium hydroxide in 150 parts of water, gaseous phosgene is introduced with ice-cooling at 5–10° C. until the solution shows an acid reaction. The excess phosgene is removed by blowing in air, the separated product is filtered off with suction, washed and dried. After boiling the filter cake with dioxane, the yield is 8 parts (i.e. 33% of the theoretical) of a product having the formula

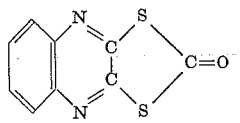

Melting point 182–183° C. (dioxane).
There can be isolated from dioxane 8 parts

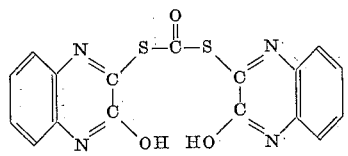

Melting point >300° C.

*Example 5*

10 parts of 2,3-dimercaptoquinoxaline are suspended in 100 parts of dioxane with the addition of 14 parts of hexahydro-dimethylaniline and treated dropwise with stirring at room temperature with 13 parts of thionylchloride. The temperature rises to about 50° C. The mixture is stirred at this temperature for a further 1 hour, cooled and poured into about 500 parts of water. The insoluble matter is filtered off with suction, washed with water and dried. Yield: 8 parts (i.e. 65% of the theoretical) of a product which chiefly consists of a compound having the formula

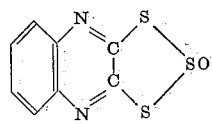

and melts at about 170° C. with decomposition.

*Example 6*

While stirring and cooling externaly with ice and water there are introduced into 50 ml. of acetone below 15° C. at the same time (a) a solution of 30 grams of dimercaptoquinoxaline and 12.5 grams of sodium hydroxide in 100 ml. of water, and (b) a solution of 29.5 grams of chloroformic acid methyl ester in 100 ml. of acetone. Stirring is continued for 1 hour and then 200 ml. of water are added; the crystals which separate are filtered with suction. There are obtained 35 grams (75% of the theoretical) of a product of the following formula:

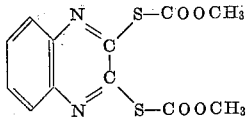

of the melting point 135° C. (alcohol).

By the same way but using instead of the chloroformic acid methyl ester a corresponding equinmolecular amount of chloroformic acid allyl ester there is obtained the corresponding diallyl ester (I) of the melting point 39° C., from chloroformic acid benzyl ester the corresponding dibenzyl ester (II) of the melting point 96–98° C., and from chloroformic acid phenyl ester the corresponding diphenyl ester (III) of the melting point 80–82° C., which may be characterized by the following general formula:

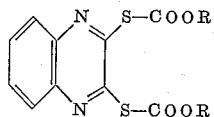

I=R=CH$_2$—CH=CH$_2$
II=R=CH$_2$—C$_6$H$_5$
III=R=C$_6$H$_5$

Starting from phenyl-substituted, 2,3-dimercaptoquinoxaline there are obtained with different chloroformic acid esters according to the same method of preparation as said above the following compounds:

| | | Melting Point, °C. |
|---|---|---|
| 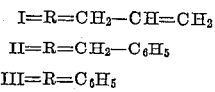 | | [1] 61.63 |
| 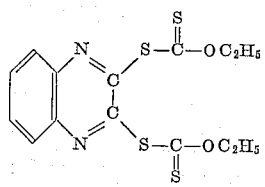 | R=CH$_3$<br>R=C$_2$H$_5$<br>R=—CH$_2$—CH$_2$Cl | [1] 91–93<br>[1] 103–105<br>oily |
| | R=CH$_3$<br>R=C$_2$H$_5$<br>R=C$_6$H$_5$ | oily<br>oily<br>153–155 |
| | | [2] 166–168 |

[1] From ligroin.
[2] From alcohol.

Example 7

19.4 grams of 2,3-dimercaptoquinoxaline are dissolved by means of 8 grams of sodium hydroxide in 50 ml. of water and then further diluted with 150 ml. of acetone. While stirring and cooling below 15° C. there are added slowly 25 grams of thiocarbonic acid ethyl ester chloride. Stirring is continued for 1 further hour, the mixture is treated with 250 ml. of water, and the crystals, which separate, are filtered with suction. 15 grams of the following compound are obtained:

Upon purifying the compound by dissolving it in hot benzene and precipitating by means of ligroin it melts at 136–138° C.

Example 8

23.8 grams of the disodium salt of 2,3-dimercaptoquinoxaline are mixed with 15 ml. of water. Thereafter 150 ml. of dioxane are added. At room temperature and by external cooling there are added dropwise 23.6 grams of dimethyl carbamic acid chloride. The mixture is then slowly heated to 70° C. and kept for further 2 hours at this temperature. Upon cooling and adding 600 ml. of water the mixture is basified with sodium hydroxide at a pH of 11. The product which separates is filtered with suction and dried. There are obtained 10 grams of the following compound:

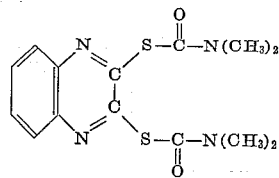

melting at >300° C.

Example 9

Into a mixture of 20 grams of 2,3-dimercaptoquinoxaline, 8 grams of sodium hydroxide, 30 ml. of water and 150 ml. of acetone there are slowly introduced 24.7 grams of dimethyl thiocarbamic acid chloride. The temperature slowly rises to 50° C. and is kept at this temperature for a further half an hour. The mixture is cooled to room temperature and filtered with 600 ml. of water. After filtration with suction and drying there are obtained 25 grams (68% of the theoretical) of a compound of the formula

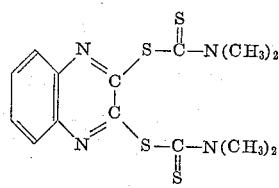

which may be recrystallized from dioxane, melting above 200° C. under decomposition.

Example 10

A suspension of 19.4 grams of finely divided dimercaptoquinoxaline in 200 ml. of pyridine is treated while cooling and stirring dropwise with 25 grams of phenyl isocyanate. The mixture is stirred for 1 hour at room temperature and the pyridine then is distilled under slight vacuo. The residue is treated with 1/10 N hydrochloric acid and the mixture is filtered with suction. After washing with water the cake is dried. There are obtained 10 grams of the following compound

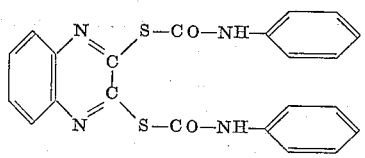

melting above 300° C. (from dioxane).

Example 11

A mixture of 30 grams of 2,3-dimercaptoquinoxaline, 12 grams of sodium hydroxide, 150 ml. of acetone and 150 ml. of water is cooled, and while stirring there are introduced dropwise 43.4 grams of benzoyl chloride. Stirring is continued for 5 hours, whereby further sodium hydroxide solution is introduced slowly to keep the pH value at about 12–13. At the end the mixture has to be practically neutral. The precipitate is filtered with suction and treated with boiling alcohol. Upon filtration from the alcohol there are obtained 18 grams of a monobenzoyl compound of the following formula:

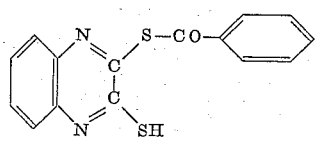

melting above 300° C.

Example 12

Into a suspension of 23.8 grams of the disodium salt of 2,3-dimercaptoquinoxaline in 150 ml. of dioxane and 15 ml. of water there are introduced while stirring and cooling to room temperature 40.9 grams of perchloro methyl mercaptane. Stirring is continued for half an hour at 35–40° C. After cooling water is added and the precipitated product is filtered with suction and dried. Yield: 24 grams (50% of the theoretical) of the following compound

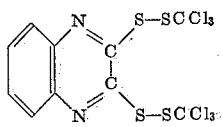

melting at 132–134° C. (from ethyl acetate)

*Example 13*

Into a solution of 31.2 grams of 6-methyl-2,3-dimercaptoquinoxaline and 14 grams of sodium hydroxide in 200 ml. of water there are added slowly below 15° C. 19 grams of thiophosgene. Stirring is continued for 30 minutes at room temperature, then the product is filtered with suction and dried. Yield: 29.8 grams (80% of the theoretical) of the following compound

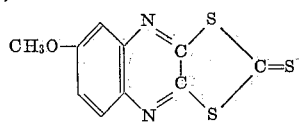

having a melting point of 162–164° C. (from dioxane). In an analogous manner there are obtained from other benzene-substituted 2,3-dimercaptoquinoxalines the following compounds:

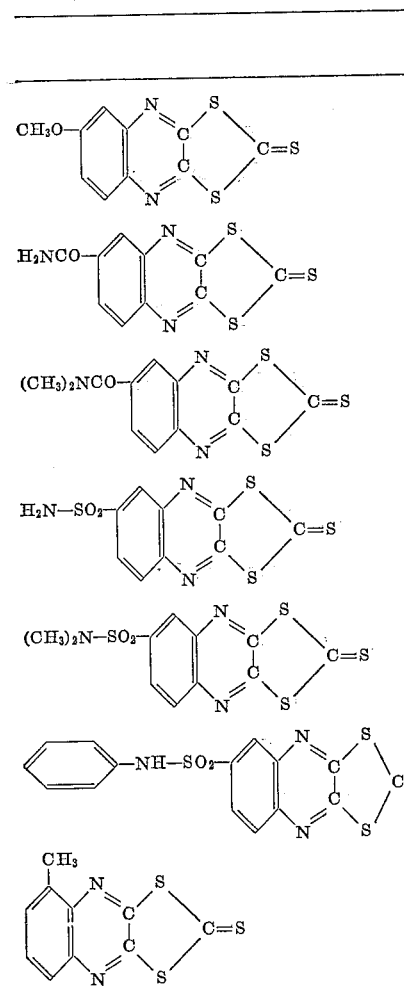

| Structure | Melting Point, °C. |
|---|---|
| CH₃O-...-C=S | 157–159 (from glycolmonomethyl ether). |
| H₂NCO-...-C=S | 266 (from dimethyl formamide). |
| (CH₃)₂NCO-...-C=S | 210–212 (from glycolmonomethyl ether). |
| H₂N-SO₂-...-C=S | 265 (from dimethylformamide/water). |
| (CH₃)₂N-SO₂-...-C=S | 202 (from butanol). |
| C₆H₅-NH-SO₂-...-C=S | 225–230 (from butanol). |
| CH₃-...-C=S | 138–140 (from carbontetrachloride/ligroin). |

| Structure | Melting Point, °C. |
|---|---|
| 5-CH₃, 6-... C=S | 167 (from benzene). |
| H₃C-, H₃C-... C=S | 210–211 (from dioxane). |

*Example 14*

350 grams of 6-methyl-2,3-dimercaptoquinoxaline and 135 grams of sodium hydroxide are dissolved in 200 ml. of water. While stirring and cooling there is introduced at a temperature below 15° C. gaseous phosgene. While constantly adding dropwise a 25% sodium hydroxide solution the pH value is kept at 13–13.2. The introducing of phosgene is interrupted when adding 340 grams of sodium hydroxide (in the form of its 25% solution). The suspension is filtered with suction and the filter cake is washed neutral with water and dried. Yield: 270 grams (69% of the theoretical) of the following dithiocarbonate:

| Structure | Melting point, °C. |
|---|---|
| H₃C-...C=O | 171–172 (from toluene). |

By the same way there are obtained the following compounds:

| Structure | Melting point, °C. |
|---|---|
| CH₃-...C=O | 135 (from ligroin). |
| CH₃-, H₃C-...C=O | 175–180 (from ligroin). |
| H₃C-, H₃C-...C=O | 208 (from toluene). |
| CH₃O-...C=O | 165–166 (from dioxane). |
| (CH₃)₂N-CO-...C=O | 172–176 (from butanol/ligroin). |

| | Melting point, °C. |
|---|---|
| 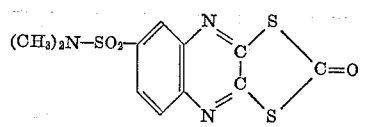 | 182. |
| 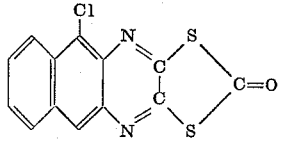 | 250 (xylene). |

*Example 15*

16.5 grams of 5-carboxy-2,3-dimercaptoquinoxaline are dissolved in 100 ml. of water by means of 6 grams of sodium hydroxide. Below 15° C. there is introduced a stream of gaseous phosgene. A solution of 12 grams of sodium hydroxide (in 50 ml. of water) is added dropwise to keep the pH value at 13–13.2. After the sodium hydroxide solution has been added introduction of phosgene is continued until the solution reacts neutral. The product obtained is filtered with suction, washed neutral with water and dried. There are obtained 11 grams of the following compound

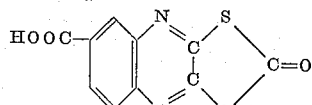

melting above 300° C. (from dioxane).

The 2,3-dimercaptoquinoxaline-5-sulfonamide yields by the same way the following compound

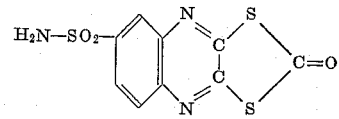

melting at 225–230° C.

*Example 16*

18 grams of finely divided disodium salt of 2,3-dimercaptoquinoxaline are suspended in 100 ml. of dioxane. At room temperature there are added dropwise 13.2 grams of phenylisocyane dichloride. Stirring is continued for 1 hour at room temperature and then for 2 further hours at 80° C. The mixture is cooled to room temperature and is then poured into 750 ml. of water. The crystals which separate are filtered with suction, washed with water and dried. 14 grams of the following compound are obtained

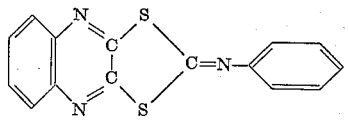

melting at 119–120° C. (from ligroin).

*Example 17*

Into a suspension of 30 grams of finely pulverised disodium salt of 2,3-dimercaptoquinoxaline in 150 ml. of dimethyl formamide there are dropped while cooling 13 grams of sulfur dichloride. Stirring is continued for 30 minutes at room temperature and 1 hour at 40–50° C. The mixture is cooled and poured into 1 liter of water. The precipitated crystals are filtered with suction, washed and dried. There are obtained 15 grams of the following compound:

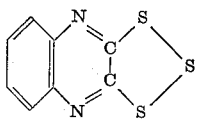

melting above 290° C.

What is claimed is:
1. A compound of the formula

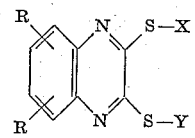

wherein R and R' each stand for a member selected from the group consisting of hydrogen, lower alkyl, halogen, nitro, lower alkoxy, aminocarbonyl, aminosulfonyl and carboxyl; X stands for a member selected from the group consisting of hydrogen, lower alkoxycarbonyl, phenyloxycarbonyl, lower alkoxy-thiocarbonyl, aminocarbonyl, aminothiocarbonyl, phenylcarbonyl and trichloromethylsulfenyl; Y is a member selected from the group consisting of lower alkoxycarbonyl, phenyloxycarbonyl, lower alkoxy-thiocarbonyl, aminocarbonyl, aminothiocarbonyl, phenylcarbonyl and trichloromethylsulfenyl.

2. A compound of claim 1 wherein R and R' are each hydrogen and X and Y are each lower alkoxycarbonyl.

3. A compound of claim 1 wherein R and R' are each lower alkyl and X and Y are each lower alkoxycarbonyl.

4. A compound of claim 1 wherein R and R' are each hydrogen and X and Y are each phenyloxycarbonyl.

5. A compound of claim 1 wherein R and R' are each hydrogen and X and Y are each lower alkoxy-thiocarbonyl.

6. A compound of claim 1 wherein R and R' are each lower alkyl and X and Y are each phenoxycarbonyl.

7. A compound of the following formula:

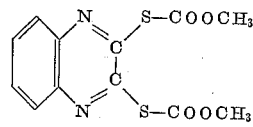

8. A compound of the following formula:

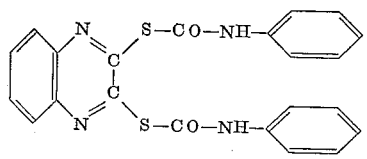

9. A compound of the following formula:

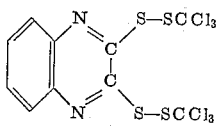

10. A compound of the following formula:

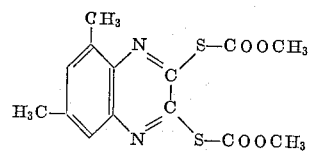

11. A compound of the following formula:

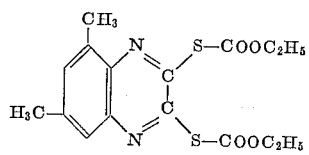

No references cited.